United States Patent [19]

David

[11] Patent Number: 4,543,674
[45] Date of Patent: Oct. 1, 1985

[54] WATER SAVING INSERT FOR TOILET TANK

[76] Inventor: Constant V. David, 4952 Field St., San Diego, Calif. 92110

[21] Appl. No.: 644,786

[22] Filed: Aug. 27, 1984

[51] Int. Cl.$^4$ ............................................. E03D 1/00
[52] U.S. Cl. ......................................... 4/415; 4/353; 4/661
[58] Field of Search ........... 4/415, 661, 252 R, 252 A, 4/321, 353

[56] References Cited

U.S. PATENT DOCUMENTS

| | | | |
|---|---|---|---|
| 3,259,918 | 7/1966 | Walker, Sr. et al. | 4/415 X |
| 3,731,324 | 5/1973 | Moon | 4/415 |
| 3,811,134 | 5/1974 | Throckmorton | 4/415 |
| 3,812,544 | 5/1974 | Risley | 4/415 |
| 3,820,170 | 6/1974 | Kern et al. | 4/415 |
| 3,877,081 | 4/1975 | Klein | 4/415 |
| 3,879,765 | 4/1975 | Moon | 4/415 |
| 3,982,282 | 9/1976 | Kong | 4/415 |
| 4,121,308 | 10/1978 | Raab | 4/415 |
| 4,152,793 | 5/1979 | Mills | 4/415 X |

Primary Examiner—Henry K. Artis

[57] ABSTRACT

An insert installed inside the toilet tank arranged and constructed to decrease the amount of water held in the tank. While the amount of flushing water used for each flush is appreciably less than it would be without this insert in place, the bulk of that water is still delivered to the toilet bowl under an average head higher than that which is normally obtained without the insert. The toilet flushing action is thus as effective as it would be otherwise, but only with a fraction of the water volume being required. The resulting saving of water is substantial and the tank also fills up at a much faster pace. The insert is supported by the bottom and side walls of the existing toilet tank and does not otherwise interfere with the operation of the toilet tank internal equipment. Because no water is allowed to flow between the insert body and the toilet tank walls, this space being sealed off, this insert also provides safety in case the toilet tank walls are accidentally broken.

14 Claims, 8 Drawing Figures

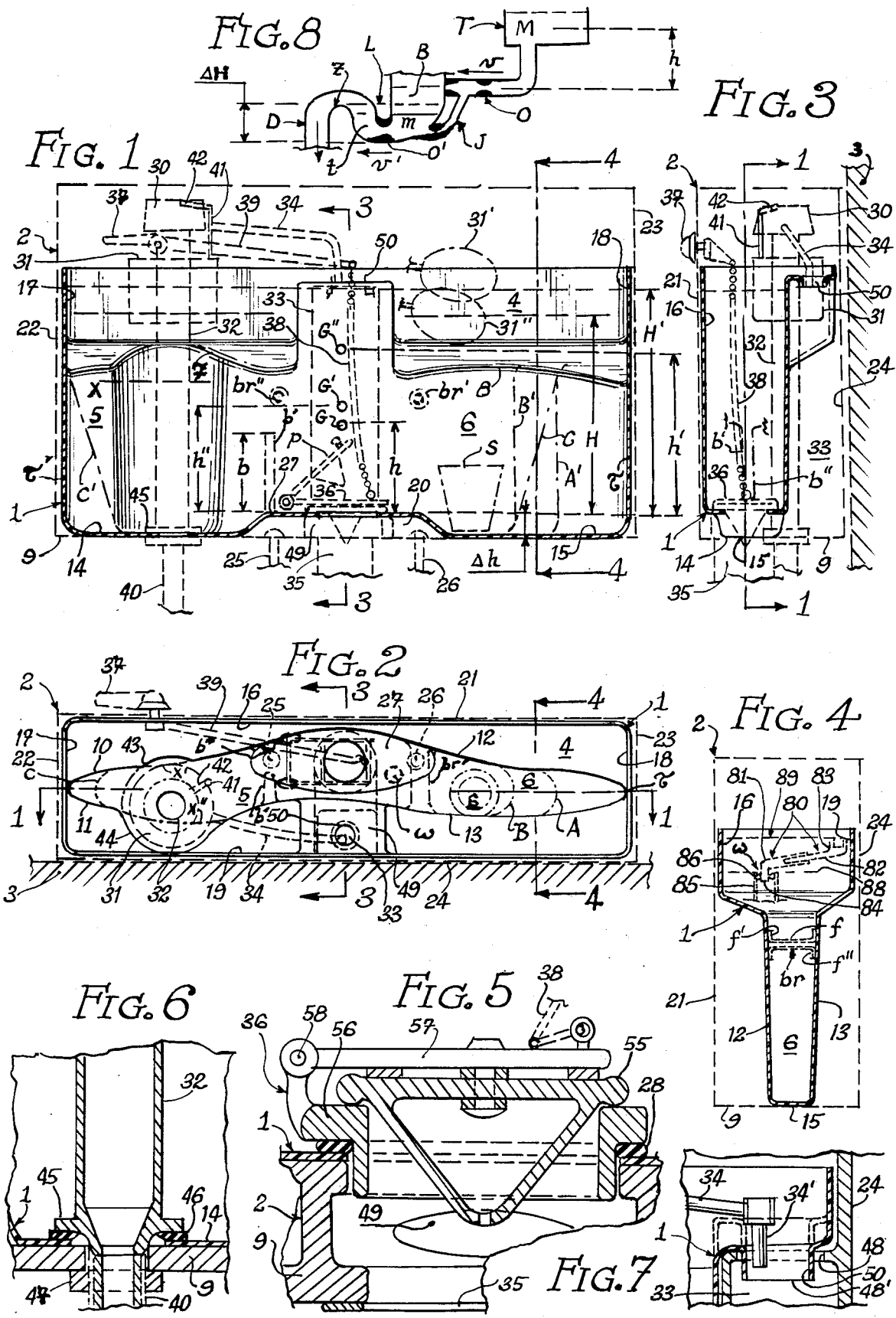

WATER SAVING INSERT FOR TOILET TANK

BACKGROUND OF THE INVENTION

The present invention relates to a one-part insert for installation in the tank of a toilet in a manner such that the amount of water flushed by emptying the tank into the toilet bowl is substantially decreased, without appreciably affecting the flushing action of the water being discharged. This is done by raising the average head under which this smaller amount of flushing water is delivered.

For several decades, toilets have been arranged and constructed so that the toilet bowl, the flushing water tank and the flushing valve constitute a compact assembly, easy to install and pleasing to the eyes. Decades ago, the urban population was smaller, the amount of water needed for non-residential uses was lower, the natural water supply was less polluted and more than adequate to satisfy the needs for potable water of all urban populations, although such potable water was used for many other applications that do not require potable water such as gardening. Residential dwellings were then built and equipped with only one signal water supply system providing only potable water, whatever use of it the dwelling residents intended to make. Water conservation was not important then. Large toilet tanks were thus used to equip bathrooms, much larger than actually needed to insure an effective flushing of the toilet bowl. Many such oversized toilet tanks have been installed in several millions of dwelling units and are still in use.

During these past decades, three interrelated phenomena became more and more evident: (1) an urban population explosion, especially in the sunbelt regions where water is most scarce; (2) an accelerated ever increasing need of water for industrial uses; and (3) a concomittant increase in the degree of pollution of natural water. In some parts of the sunbelt area (Arizona and Southern California especially), the water situation is foreseen as becoming rapidly very critical. Every attempt to conserve potable water should be made, which means that all excessive uses of potable water should be curbed. It is commonly agreed that one excessive use of potable water results from the excessive amount of water which is flushed into the toilet bowls of millions of dwelling units, several times a day, unnecessarily.

New toilet tanks have been designed, and are now installed, with water conservation in mind; their internal volume has been decreased. The upside down obelisk shape that some are given also helps raise the center of gravity of the water stored. This constitutes a step in the right direction and points out the trend. Nevertheless, it is desirable to pursue such a trend a step further: keep decreasing the volume of water while raising the center of gravity of the water considerably, so that the head that generates the flushing impulse imparted to the material residing in the toilet bowl is not affected.

SUMMARY OF THE INVENTION

It is therefore a primary object of the present invention to provide an insert that can be installed in existing toilet tanks for lessening the effective inside volume of such tanks.

It is another object of the present invention to provide a toilet tank insert that raises the center of gravity of the amount of water to be flushed.

It is still another object of the present invention to provide a toilet tank insert that transmits the water static pressure forces to the bottom and side walls of said tank.

It is still another object of the present invention to provide a toilet tank insert that does not interfere with the operation of the flushing system already installed in said tank.

It is still another object of the present invention to provide a toilet tank insert that consists of one single simple part which is held in place and sealed by means of the standard clamping and sealing means already used to insure water tightness and stability between the toilet tank bottom and the toilet structural body.

It is still another object of the present invention to provide a toilet tank insert that is simple, easy to install, inexpensive to manufature and reliable.

It is still another object of the present invention to provide a toilet tank insert that considerably reduces the amount of water wasted during flushing, while insuring the same effectiveness of the flushing action.

Accordingly, the present invention provides an insert for installation in toilet tanks that saves and conserves water in a manner such that the flushing effectiveness is not altered and that the economy in the cost of the water saved is much higher than the cost of said insert and of its installation.

DESCRIPTION OF THE DRAWINGS

FIG. 1 is a simplified midsectional elevation view of the insert shown inside a typical toilet tank presented in diagrammatic form in phantom lines, taken along section lines 1—1 of FIGS. 2 and 3.

FIG. 2 is a top view of the insert shown in FIG. 1.

FIG. 3 is a midsectional side elevation view of the insert taken along section lines 3—3 of FIGS. 1 and 2.

FIG. 4 is a sectional side view taken along line 4—4 of FIGS. 1 and 2.

FIG. 5 is an enlarged fragmentary sectional view of the sealed joint between the toilet tank, the insert body and a typical flushing valve seat arrangement.

FIG. 6 is an enlarged fragmentary sectional view of the sealed joint between the toilet tank, the insert body and a typical high pressure control valve support tube.

FIG. 7 is a partial enlarged sectional view of a detail shown in FIG. 3 and depicting the overflow connection between the insert and the toilet tank.

FIG. 8 is a simplified diagrammatic schematic of a typical toilet installation displaying the system characteristics.

DETAILED DESCRIPTION OF THE INVENTION

Referring to FIGS. 1, 2, 3 and 4, the insert consists of one single body 1, shown in solid lines, positioned inside a typical toilet tank 2, outlined in phantom lines, located next to wall 3 of a bathroom or restroom. The internal volume of insert body 1 comprises three distinct interconnected chambers 4, 5 and 6. Upper chamber 4 is open at the top and constitutes the largest part of the insert internal volume. The bottom walls 7 and 8 of chamber 4 are supported by the side walls 10 and 11, 12 and 13 of lower chambers 5 and 6 respectively. Walls 10 and 11, 12 and 13 are a continuation of and supported by bottom walls 14 and 15 respectively, which rest on bottom wall 9 of the toilet tank. Side walls 16, 17, 18 and 19 of upper chamber 4, when bulging out, rest against side walls 21, 22, 23 and 24 of the toilet tank.

Toilet tank 2 is bolted to the back structure of the toilet bowl by two bolts 25 and 26. Their heads protrude above the upper surface of bottom wall 9. Also, the flush valve seat of some toilet bowl configurations are slightly elevated with respect to that upper surface of bottom wall 9. To accommodate these two singularities, bottom wall 14 of insert 1 is configured to form a flat top dimple 27. This flat top dimple wall is clamped between the flush valve seat seal 28 and toilet tank body 2 as depicted in the detail sectional view of FIG. 5. When the insert is filled with water, space 20 is empty and always sealed off. The heads of bolts 25 and 26 thus need no water protection.

For illustrative purpose, the toilet tank configuration presented in FIGS. 1, 2 and 3 is used to describe the present invention. Any other typical toilet tank configuration could be used for that purpose. All toilet tanks basically operate in the same manner and the example configuration selected herein is well representative of existing toilet tanks now in use. Such toilet tank usually comprises a high pressure control valve 30, a guided float 31, a valve-float supporting tube 32, an overflow channel 33, an overflow pipe 34, a discharge channel 35, a flush valve assembly 36 and a flushing lever 37 connected to flush valve assembly 36 by a link chain 38 attached to the end of lever 39. High pressure water is brought by tube 40. For ease of illustration and explanation, the float configuration used herein corresponds to a cylindrical float, guided by valve-supporting tube 32, and connected to high pressure control valve 30 by connecting rod 41 articulated on lever 42 which actuates high pressure control valve 30.

Side walls 10 and 11 of chamber 5 are shaped in a manner such that bulges 43 and 44 can accommodate the vertical displacements of float 31 down to a level such as that indicated by line X of FIG. 1. These two bulges may or may not extend down to the bottom wall 14, as shown by phantom lines X' and X" of FIG. 2, in order to save additional water and add to the lateral rigidity of walls 10 and 11. Valve-supporting tube 32 terminates, at the bottom end, with a flange 45, as illustrated in FIG. 6, thereby clamping seal 46 and bottom wall 14 of insert 1 onto bottom wall 9 of the toilet tank by means of nut 47. In the bottom half of chamber 5, internal wall surfaces represented by phantom lines X' and X" need only be apart a distance slightly larger than the outside diameter of flange 45 or seal 46.

The toilet tank configuration of FIGS. 1, 2 and 3 corresponds to an arrangement in which overflow channel 33 is part of back wall 24 of toilet tank 2. This configuration can accommodate an oscillating float attached to the end of a long stem that actuates valve 30. Channel 33 collects overflowing water through hole 48, as shown in FIG. 7, and discharges it through channel 49 which voids it into discharge channel 35. Overflow pipe 34 is usually shaped so that its free end 34' discharges in channel 33. In other toilet tank configurations, channel 33 consists of a duct attached and connected to the discharge space located under the flush valve, and whereby such duct is made part of the flush valve assembly. In such cases, the location of snout 50, part of the wall of insert 1, is caused to be connected to the upper open end of such overflow duct. In FIG. 7, snout 50 is shown fitting into hole 48 at the top of overflow channel 33.

In FIG. 5, the flush valve configuration shown does not incorporate an overflow ducting channel connection, for reasons earlier stated. The walls of channel 49 are part of the toilet tank bottom wall 9, and the top wall of channel 49 thus constitutes the mounting structure for flush valve assembly 36. The details of the clamping system of assembly 36 are omitted, being irrelevant to the present invention. For flushing, chain 38 pulls flap valve 55 off its seat 56 by means of valve frame 57 articulated at point 58. Both the external and internal configurations of valve 55 are such that, during the flushing period, valve 55 remains open until all water has drained out.

DISCUSSION AND OPERATION

To provide effective flushing, because of the mode of operation of the toilet bowl, the bulk of the flushing water must be discharged as quickly as possible. To conserve and save water, the minimum of water needed to complete an effective flush in one cycle should be used, no more. In a simple but adequate manner, one can say that the instantaneous velocity v of the water flowing into the toilet bowl can be expressed as $v = K\sqrt{H}$ where K is a constant depending on the system physical characteristics and H is the height of the water level above the flush valve at any time during the flushing discharge cycle. H decreases as the flushing action proceeds. This, as the experience clearly verifies, indicates that the flushing rate (and its effectiveness) is much higher at the onset of the flushing cycle than at the end. At least half of the flushed water discharged by a standard toilet tank is usually wasted. Many attempts have been made to economize water by eliminating part of this wasteful tailend of the flushing cycle. For instance, cement blocks, bottles, side damming parts and water retaining pockets have been installed in toilet tanks with that very purpose in mind. Most of these approaches are effective, but on too small a scale, because the amount of water saved is not large enough. More water, in the bottom half of the toilet tank, must and can be either trapped or eliminated altogether. That is the main purpose and primary function of the insert described in the above section.

The distance H between the water free surface and the flush valve orifice which determines the instantaneous rate of discharge during flushing, decreases as the water level lowers. It is more meaningful to relate the effectiveness of the flushing action directly to the amount of water used and indirectly to the manner in which it is utilized. Because the insert of the present invention is to be used in and in connection with existing toilet tanks, the maximum attainable for H is fixed (H') and corresponds to the level at which hole 48 is located. If the center of gravity of the water mass is point G for the toilet tank shown in FIGS. 1, 2 and 3, without the insert, for the minimum amount of water needed in such a case, the highest position that this point can reach is G' if the float is set at the maximum height level (level of hole 48 orifice). However, if more than half of that minimum water amount is removed from the bottom two thirds of height H, the center of gravity of the remaining smaller mass of water is relocated at G". The product hxV, where h is the height of the center of gravity of a mass of water contained in a volume V discharged during the flushing, is a fair approximation of the effectiveness of the flushing of the toilet bowl, within the range established by H'. The small height $\Delta h$ (FIG. 1) can be ignored in such an approximation. For the insert configuration shown in solid lines in FIGS. 1 to 4, the product hxV, hereinafter referred to as effectiveness product, is h'xV' if V' is the volume of water contained inside the insert. h' is about twice as large as h, thus, for equal effectiveness, V' can be half of V. As FIGS. 1, 2 and 4 readily show, volume V/2 is eliminated from the bottom half of the toilet tank. More water can even be saved by further eliminating part of the volume of chamber 6 as indicated by phantom lines A and A', and even B and B' (greater degree of elimination). Out of chamber 5, another reduction in size can be obtained by making walls 10 and 11 follow lines X' and X" and moving wall edge τ' to C'.

Now, three other considerations need be discussed, one functional in nature, the second structural and the last operational. Both the shapes and dimensions of the insert must of course permit its easy installation. The insert shown in solid lines in FIGS. 1, 2, 3 and 4 meets this requirement. It would also allow the use of a cantilevered float arrangement, as depicted by phantom lines 31' and 31" of FIGS. 1 and 2, which represent the two extreme positions assumed by such a cantilevered oscillating float arrangement. The only possible interaction mode of the insert on the functioning of the existing toilet tank equipment is that of the influence of the water flow changes on the flap valve, after it has been caused to open. The three main directions of the water flow into the open valve are downward and sideways. The vortex that usually forms in the toilet tank at the end of the flushing is delayed or practically eliminated because of the unidirectional narrowing of the insert cavity on both sides of the flush valve. The water flow from chamber 6 tends to keep flap valve 55 open and the water flow from chamber 5 tends to close it. As will be discussed later, the wall of dimple dome 27 can be shaped to insure that the water flow actions on flap valve 55 keep it open until the water free surface inside the insert has reached a preset level. The insert walls of chamber 4 can be supported by the toilet tank walls and are subjected only to small lateral loads. However, the side walls of chambers 5 and 6 are loaded in two orthogonal directions: laterally and vertically. The lateral loads, generated by internal hydraulic pressure, tend to cause walls 10, 11, 12 and 13 to bulge out. The loads generated on bottom walls 7 and 8 of chamber 4 by the hydraulic pressure compress walls 10, 11, 12 and 13 and tend to make them buckle, thereby accentuating their initial tendency to bulge out. To keep the insert walls thin and light, in order to economize material, walls 10, 11, 12 and 13 can easily be laterally stiffened and reinforced by corrugations. To maximize water conservation, the natural tendency is to narrow chambers 5 and 6 and to raise bottom walls 7 and 8 as high as possible. Although V' is thus minimized and h' then maximized, the value of the effectiveness product (h'xV') must be maintained above a critical minimum value determined by the probability that one flushing will be adequate most of the time. Because, if less water is used during each flushing, but a second one is required too often to complete the proper emptying of the toilet bowl, the attempt thus made at water saving has become self defeating. This needs further elaboration.

Most well conceived toilet bowls function in a similar manner. The schematic diagram of FIG. 8 shows a typical simplified version of a toilet system. A certain amount of water and matter of total mass m is contained in the bowl B to be flushed out and discharged through trap t into drain duct D. The amount of water (mass M) contained in toilet tank T is available to flush m out of bowl B. The flush valve in tank T and the ducting between tank T and bowl B constitutes a flow restriction that slows the flow of M into bowl B. It can be represented by a restricting orifice such as O. The ducting from bowl B into drain D through trap t can also be represented by another restricting orifice O' larger than O. The physical characteristics of O, O' and m are established and can be considered almost fixed and constant. The only two variables left for adjustment are M and h. The value of h, as earlier explained, has a practical maximum limit set by the dimensions of the toilet tank.

In the case of best designed and most efficient toilet systems, the water flow into the toilet bowl follows two concurrent though separate paths. As shown in the schematic of FIG. 8, some of water M is diverted along path J to be injected at the bottom of the toilet bowl into trap t entrance to create a jet pump effect. This jet pump ejects mass m into trap t with part of M. Then the remnant of mass M flows into bowl B and the bulk of m and part of M are hydrostatically "pushed over" the top of ridge Z of trap t. When water stops flowing into bowl B, the water levels in trap t and bowl B finally reach equilibrium. A toilet that operates in that fashion seldom requires a second flushing cycle. All foreign matters are eliminated at the end of the first flush, and extra water (half of M) is usually wasted. The following discussion is based on the assumption that this type of toilet is used, being that which can most benefit from the present invention. As most people are aware of, adding water slowly on top of mass m does not flush the bowl. Momentum must be imparted to the toilet bowl content to force it out.

Assuming that temporal considerations can be neglected as a first approximation, the system operation can then be summarized as follows:
(1) The potential energy g.M.h, g being the gravitational constant, is available in tank T and is released during flushing, minus some losses;
(2) A momentum M.v, v being the velocity at which water exits tank T, is generated by the flushing water mass M;
(3) A total amount of energy $(m+M).[v']^2/2 + \Delta H.g.(M+m)$, v' being the exit velocity through orifice O', plus losses must be generated to empty bowl B, as a minimum; and
(4) A momentum $(m+M).v'$ is transferred in the process to the discharged products of total mass $(m+M)$. Assuming that most of the discharged products clear low point Z at the top of trap t, an adequate operation of the system means that:
(1) g.M.h must be larger than $(m+M).[v']^2/2 + \Delta H.g.(M+m)$; and
(2) M.v must also be larger than $(m+M).v'$, if v is expressed as $\sqrt{2g.h}$, because the velocity at which M reaches m is smaller than v.

The shape of insert 1 establishes a relationship betwen h and M, because any value of M of course defines a singular value for V'. It can thus be seen that an optimized combination of values for h and M (and V') can be derived, for any given toilet configuration and a corresponding highest level that is acceptable for the water free surface, which corresponds to the level at which overflow orifice 48 is positioned, minus a fraction of an inch for extra safety. However, depending upon the usage made of the toilet and the type of user, once in a while, the possibility that a second flushing cycle will be required must be considered acceptable.

With the proper understanding of such assumptions and provisions, it can now be stated that the insert should be constructed to take full advantage of the full height of overflow channel 33. The brim of the insert body then should reach just under the axle of flushing lever 37, as shown in FIGS. 1, 3 and 7. If and when applicable, and feasible, the overflow snout should be raised even higher than overflow orifice 48, as shown in phantom lines in FIG. 7 to gain an extra increment for h, to reach the peak of flushing effectiveness.

As illustrated in FIGS. 1 and 2, the insert body is secured in only two locations which are those where the flushing water enters and leaves the toilet tank inner space, through the toilet tank bottom wall. The clamping, securing and sealing means of the components that channel this water ingress and egress, onto the toilet tank bottom wall, are also used to hold the insert body, as depicted in FIGS. 5 and 6. The upper surface of the insert wall boundary is wide open. Its bottom surface walls rest on the bottom wall of the toilet tank. Only one additional opening in the insert body is needed to evacuate the overflow water. No seal is required at that location, as shown in FIG. 7. A snout-shaped discharge fits inside the opening 48 of the toilet tank overflow channel. Depending upon the toilet tank design and the type of flushing equipment already installed inside the toilet tank, the location of the top of overflow channel 33 varies. If located at a point such as $\omega$ of FIG. 2, in which case the overflow channel is part of the flushing valve system, orifice 48' of FIG. 7 is plugged or connected to $\omega$. In that instance, to raise the water level above opening 48 of a centrally located overflow channel, a short tube can be inserted into the top of channel 33 duct. As earlier explained, raising this water level to its maximum value is very desirable. The straight side walls of chamber 4 bulge out under hydrostatic pressure to come to rest against the toilet tank walls. When full, the insert body is thus well supported in all directions. As easily seen, the installation of an insert in an existing toilet tank is as simple and straightforward as the installation of the flushing equipment itself. Because all toilet tank models and designs do not have the same shapes and dimensions, and because it is desirable economically to minimize the number of insert configurations, the top part of the insert body is systematically underdimensioned to fit inside the largest number of existing toilet tank designs. This means that in many cases the upper walls of an empty insert may be located up to $\frac{1}{2}$ inch away from the toilet tank inner wall surfaces. In such instances, the front and back upper walls of the insert body only bulge out slightly more when full to meet the toilet tank front and back walls. Such small outwardly-oriented deformations represent only a fraction of the total deformation that the insert can withstand, when full to the rim, without the assistance of the toilet tank walls.

Because the top of the insert body is open, an articulated swing-type float can easily be accommodated. The travel allowed to such a float is limited only by the location of side bottom 8' of chamber 4 and corresponds to the distance between positions 31' (high pressure control valve closed) and 31" (high pressure control valve open) shown in FIG. 1. Such a float can be positioned laterally any place between walls 16 and 19 of the insert body, to accommodate a centrally located overflow channel duct.

Near the flush valve, walls 12 and 13 are located as close as possible to the flush valve flap, without interfering with its motion, in order to save water. As a toilet tank empties during a flushing cycle, usually a vortex naturally forms when the water free surface reaches a critical level. This vortex causes two detrimental effects: (1) some useful potential kinetic energy is transferred to the vortex and wasted; and (2) the vortex decreases the discharge orifice effective size of the open flush valve and thus slows down the tailend of the flushing cycle. Eliminating such a vortex seems desirable. The proximity of walls 12 and 13 to the flush valve on two opposite sides constitutes an interference with the formation of the vortex. The proximity and orientation of each wall can be varied and adjusted to insure that the asymmetry of the channelling effect on the water flow minimizes the probability that a vortex will form. This asymmetry of the water flow can be further enhanced by causing chamber 6 to empty faster than chamber 5 as soon as the water level reaches a preset value.

This can easily and very effectively be achieved by forming two inwardly bulging narrow protrusions on walls 12 and 13 at the end of chamber 5, nearest to the valve flap, such as b' and b" (FIG. 2) of height b (FIG. 1). As the valve flap assumes a position such as p, when open, and as the water level differential between chambers 5 and 6 becomes large enough, the momentum of the water exiting chamber 5 through the gap between the ends of protrusions b' and b" (shown in phantom lines) thus causes a force to be exerted on the flap, tending to close it. A judicious choice of the width, height, shape and orientation of said gap causes the valve flap to close automatically, certainly before a vortex can form. This results in additional water being saved, water which would not have otherwise been utilized effectively.

Products are used to keep the toilet bowl clean and desinfected by adding such products into the water residing in the toilet tank. Some are packaged in containers that are placed at the bottom of the toilet tank and left there until the content has leached out. The container is then replaced. The location of such a container is indicated as S in FIG. 1 and 2, and outlined in phantom lines. Container S is shown resting on the flat bottom wall of the insert body, in a location where it can least interfere with the water flow at the end of the flushing cycle.

In order to: (1) save even more water; (2) further facilitate the preprogrammed closing of flap 55; (3) give more rigidity to the walls of chamber 6; and (4) make the insert body fabrication simpler and less expensive; tip $\tau$ of chamber 6 can be moved to positions A or even B illustrated in FIGS. 1 and 2. An even better shape for $\tau$ is a slanting shape such as C. The same applies to chamber 5, where $\tau'$ can assume the shape shown as C'.

All vertical walls of the insert body, including their reinforcing corrugations and protrusions b' and b", can easily be given a slight slant, such that the insert body "opens up" toward the top, so that the extraction of the manufactured part off the mold is rendered easier. This feature widens the selection of materials and molding (or forming) processes that can then be used to fabricate such a part. Many types of plastics are available to choose from. The cost of the material itself is almost negligible. The cost per unit is then mostly dependent upon the fabrication process used and the number of units produced. The machinery is already available, only the molds or dies are not. Enough units must be produced to justify the capital investment in such tooling and still keep the unit price low enough. Considering all regions of the Continental U.S. where water conservation is fast becoming a must, the number of units needed amounts to several millions. Based on a fraction of this number, e.g. one million, it is obvious that such units could then be marketed at a price which is justified by the saving in water expense during a fraction of the lifetime of the unit. The cost of potable water to Southern California is about $1.00 per thousand gallons. If 2 gallons per flushing cycle are saved, 5 times a day for each toilet, the total amount of potable water saved is then 3,650 g/yr. The water cost saving per unit and per year is $3.65. For an assumed unit lifetime of 20 years, the total potential saving is $73.00/unit, assuming that the existing water shortage does not drastically worsen and that a concomittant dramatic increase in cost of potable water does not materialize, which could very well happen though by 1990. Such a potential saving is too small, however, to justify replacing an old toilet tank by a new smaller one. Water conservation is more the issue than cost and is a strong motivation per se. However, because the insert could retail for less than $2.50, its cost is negligible. Costwise, the major drawback is its installation inside an existing toilet tank. This can best be done when a new flushing system needs to be installed. The cost of installing the unit in such an occurrence is nil. Otherwise, the installation by a professional in a home of only the insert could not be economically warranted. Two major exceptions, though, are important: (1) the case of large apartment complexes, and (2) the case where the owner installs the unit himself. In such cases, the installation cost per unit is nil or can be less than the cost of the unit, hence economically very attractive. Millions of dwellings fall in these two categories.

Another advantageous feature deserves being mentioned and further discussed. Because of the volume inside the insert is fully isolated and sealed off from the toilet tank walls, no water is in contact with the toilet tank walls. Most existing toilet tank walls are built with fragile and brittle materials. Although toilet tanks usually stand in a safe location where risks of accidents that could cause cracking of the toilet tank walls are low, such things happen. If a toilet tank is equipped with an insert, should the toilet tank be fractured, no water spills on the floor, it is all retained by the insert walls. They are shaped and constructed in a manner such that they will only bulge out at the top and deform without rupturing and letting water leak out. Even when wall 21 of the toilet tank is completely removed, two braces such as br' and br" positioned between (and affixed thereto) walls 10 and 11, and 12 and 13, of chambers 5 and 6 respectively, as shown in FIGS. 1 and 2, can prevent any excessive bulging which could render a full insert unstable. Braces br' and br" are shown as br in FIG. 4 and in phantom lines. The two flanges f' and f" located at both ends of middle tube f are depicted bonded to walls 12 and 13 of the insert body. Such a feature permits a continuous uninterrupted use of the toilet, even with a broken toilet tank, until such a broken tank is replaced, at no risk. Even if the flushing lever handle is part of the tank front wall that is broken and missing, the flushing action can still be initiated and take place by operating link chain 38 manually directly. Such an occasional manual operation, in case of emergency, is preferable by far to the "no-toilet" alternative, or an emergency call to a plumber on Holidays and weekends.

Also illustrated in phantom lines on the sectional view of FIG. 4 is a tube 80 connecting overflow 50 of the insert body to the entrance of overflow duct 33, when the latter is located as indicated in FIG. 2 at the position identified as $\omega$. Tube 80 is constructed with two telescoping close-fitting sections 81 and 82, so that the total tube length can easily be adjusted. The funnel end 83 of section 82 fits tightly on the outside of tube 50. The end 84 of section 81 rests on the top end of overflow duct 85. A seal 86 packed between end 84 of section 81 and overflow duct 85 insures that the water level in the insert body rises above level 88 to reach level 89 set by the float adjustment as required.

The various embodiments of the present invention discussed above then result in the improvements in the current usage of toilet tanks installed in dwellings located in regions where potable water conservation is quickly becoming critical. Such an improvement manifests itself in: (1) potable water consumption reduction; and (2) water cost net reduction. An additional improvement is the increased safety aspect of the toilet operation, if and when the toilet tank becomes structurally damaged. Finally, in the instance that the toilet tank front and/or side walls are broken, the insert of the present invention permits the continued usage of the toilet until such time as the toilet tank can be repaired or replaced at the owner's convenience and at a time deemed most suitable.

Having thus described my invention, I now claim:

1. A toilet tank insert comprising:
   means for raising the center of gravity of the mass of water to be flushed out of the toilet tank during the flushing operation of an existing toilet tank in which said insert has been installed;
   means for considerably reducing the total amount of water flushed during a normal flushing cycle as compared to the amount of water so flushed from the same toilet tank before said insert is installed, by eliminating most of the water stored in the lower internal volume of an existing toilet tank;
   means for positioning and securing said insert inside the toilet tank;
   means for transferring the hydraulic loads generated on the insert walls by the water inside said insert onto the toilet tank bottom and side walls;
   means for preventing water from reaching and coming in contact with the tank bottom and side walls, thus causing said insert to be watertight;
   means for isolating the head of the bolts fastening the toilet tank from water, thereby providing said bolt heads with protection therefrom; and
   wherein the structural damage and cracking of the toilet tank walls do not cause water to leak from inside the toilet tank, all of said water being contained inside said watertight insert.

2. A toilet tank insert according to claim 1 wherein the installed insert does not interfere with the normal operation and does not hamper the normal functioning of the existing toilet tank parts and internal equipment which control and monitor the the toilet tank flushing action.

3. A toilet tank insert according to claim 2 including:
   means for allowing the use of a float that is vertically guided and actuated;
   means for allowing the use of a float that is cantilevered and oscillates during its operation; and
   means for adapting the position of the overflow opening to the already existing location of the overflow channel inside said toilet tank.

4. A toilet tank insert according to claim 3 providing means for raising the operational free surface level of the water above that maximum level which said toilet tank normally provides when said insert is not installed, thereby raising the amount of kinetic energy and momentum delivered to the flushing water, per mass unit, at the onset of the flushing action.

5. A toilet tank insert according to claim 4 wherein the shape of one side of the bottom part of said insert permits the positioning and use of a container from which products leach out into the water inside the insert, between flushing cycles, in order to keep the toilet bowl clean and in a good sanitary condition.

6. A toilet tank insert according to claim 5 wherein the shape of one side of the bottom part of said insert deflects and directs the water flow from said side of the lower insert internal space in a manner such that the flush valve automatically closes as soon as the water flow pattern out of the toilet tank has caused the flushing to lose most of its effectiveness.

7. A toilet tank insert according to claim 6 wherein the bottom wall of said insert is positioned inside the toilet tank, clamped to the toilet tank bottom wall and sealed therefrom by those very means which are normally used for securing and sealing the high pressure inlet pipe, the high pressure control valve and the flushing valve body, which are all located inside the toilet tank, to the bottom wall of said toilet tank.

8. A toilet tank insert according to claim 7 wherein a simple, light, low cost, easy to install non-metallic one part apparatus smaller in volume than the toilet tank in which it is to be installed, is provided for use in said existing toilet tank and is compatible with the existing equipment already installed and in operation inside said toilet tank, and with the securing means thereof.

9. A toilet tank insert according to claim 8 wherein a toilet tank equipped with said insert requires considerably less water to completely and satisfactorily flush its appertaining toilet bowl, in one single flushing cycle, thereby resulting in water saving and conservation.

10. An insert for a tank of a toilet comprising:
an upwardly opening container sized to fit within the tank and enclose a set of internal flush mechanisms of the toilet, the tank and the container each having a plurality of side walls and a bottom wall, the bottom wall of the container having a first hole that registers with a flush outlet hole in the bottom wall of the tank, the bottom wall of the container having a second hole that registers with a water inlet in the bottom wall of the tank, a lower portion of the container having a width substantially smaller than that of the tank and an upper portion of the container having a length and width closely approximating that of the tank, whereby the bottom wall of the container may be tightly fastened to the bottom wall of the tank, the set of internal flush mechanisms will cause the lower and upper portions of the container to be filled with water, the container will prevent the water from contacting the side walls of the tank, and the water in the container can be flushed through the flush outlet hole in the tank.

11. A toilet tank insert according to claim 10 wherein the side walls of the lower portion are slanting inwardly as they come to join the bottom wall, thereby further decreasing the volume of water contained in the lower portion and facilitating the water flow into the flush outlet hole.

12. A toilet tank insert according to claim 10 wherein the substantially smaller width of the lower portion will cause most of the water filling the container to be stored in the upper portion and at an elevation above the flush outlet higher than that which the same volume of water would occupy in the tank without the use of said insert, whereby said volume of water will thus be delivered to the flush outlet hole with higher kinetic energy and momentum, thereby improving the water flushing action.

13. A toilet tank insert according to claim 10 wherein the side walls of the lower portion are curved, thereby providing both a stiffening and a strengthening effect to said walls.

14. A toilet tank insert according to claim 13 wherein the side wall curvatures are arranged and positioned with respect to the location of the flush outlet hole so as to create two oppositely located and almost separate chambers at the container bottom, thereby causing the water flows out of said chambers to cooperate in retarding and even preventing the formation of kinetic energy and momentum wasting vortices upstream of the flush outlet hole, whereby a more efficient and effective use of the flushing water will be obtained.

* * * * *